United States Patent
Cooley

(10) Patent No.: US 6,938,628 B2
(45) Date of Patent: Sep. 6, 2005

(54) EYEGLASS CLEANING STATION

(76) Inventor: James Cooley, 507 Woodstone Rd., Clinton, MS (US) 39056

(*) Notice: Subject to any disclaimer, the term of this patent is extended or adjusted under 35 U.S.C. 154(b) by 236 days.

(21) Appl. No.: 10/133,147

(22) Filed: Apr. 26, 2002

(65) Prior Publication Data

US 2003/0201004 A1 Oct. 30, 2003

(51) Int. Cl.[7] ................................................ B08B 3/02
(52) U.S. Cl. ........................................ 134/195; 134/199
(58) Field of Search ................................ 134/184, 186, 134/195, 199; 206/5.233

(56) References Cited

U.S. PATENT DOCUMENTS

| | | | | |
|---|---|---|---|---|
| 3,259,139 A | * | 7/1966 | Bell et al. ..................... 134/47 |
| 5,143,101 A | * | 9/1992 | Mor .......................... 134/58 R |
| 5,439,104 A | * | 8/1995 | Wolska-Klis ............... 206/233 |
| 5,794,635 A | * | 8/1998 | Maines ...................... 134/95.3 |
| 5,979,849 A | * | 11/1999 | Williams .................. 248/309.1 |
| 6,338,350 B1 | * | 1/2002 | Ewen ....................... 134/56 R |
| 6,539,957 B1 | * | 4/2003 | Morales, Jr. ............... 134/95.2 |

* cited by examiner

*Primary Examiner*—Joseph L. Perrin
(74) *Attorney, Agent, or Firm*—Charles Walter

(57) ABSTRACT

An eyeglass cleaning station with a wash chamber and tissue dispenser. The wash chamber has removable nozzles for adjusting spray and a primer bulb pump that operates by hand.

8 Claims, 2 Drawing Sheets

EYEGLASS CLEANING STATION

BACKGROUND OF THE INVENTION

The present invention relates to an apparatus for washing eyeglasses, specifically the lenses thereof.

Eyeglass lenses accumulate foreign substances that interfere with vision through the lenses. Eyeglass wearers may use any handy material to try to remove such substances. Often this merely smears the substance, thereby making matters worse. By the end of the day, there needs to be a cleaning substance where eyeglass lenses may be cleaned thoroughly. Often wearers do this during their shower or bath or in the bathroom sink. This may lead to lost, misplaced or broken eyeglasses. A vastly superior procedure would be to use a cleaning station designed for cleaning eyeglass lenses thoroughly.

Specialized methods for cleaning eyeglass lenses are well known in the art. There are special impregnated tissues and cloths that are function as lens cleaners, but they often miss a part of the lens or smudge it.

There are basically two types of apparatus for cleaning eyeglasses presently known in the art. The first type is basically a place to store a bottle for dispensing lens cleaner and a box of lens cleaning tissue (Wilkins, U.S. Pat. No. 2,411,310; Wolska-Klis U.S. Pat. No. 5,439,104). A more recent version of this type of apparatus has a clip for holding the eyeglasses while they are being cleaned (Williams, U.S. Pat. No. 5,979,849).

The second type of apparatus is basically a casing for temporarily storing eyeglass with a means for cleaning the eyeglass lenses. In its simplest form, this type comprises a temporary eyeglass storage casing and a cleaning tissue dispenser (Wadanoli, U.S. Pat. No. 2,522,909). Another version has a lens support means and, instead of a tissue dispenser, an electric wash/drying chamber (Mor, U.S. Pat. No. 5,143,101). Yet another version has a storage casing which includes, in addition to the tissue dispenser, a pump for dispensing lens cleaning solution after the eyeglasses are removed from the storage casing (Taormina, U.S. Pat. No. 6,170,651 B1). Yet another version of this type apparatus immerses the eyeglasses in a reservoir containing a dental prostheses cleaner (Muller, EP Application 0428034).

These devices all have disadvantages. Most lack a means for holding a pair of eyeglasses in position for complete, satisfactory lens cleaning with the correct spray pattern of the cleaning solution. Williams (U.S. Pat. No. 5,979,849) lacks a cleaning chamber aligned with its holding clip. Mor (U.S. Pat. No. 5,143,101) lacks a tissue dispenser and a means for varying the spray pattern of cleaning solution that reaches the lens, and is unnecessarily inconvenient and expensive in that it requires electricity not only for drying the lenses, but for cleaning them as well.

The present invention avoids these disadvantages and offers a more convenient, economical and simpler device for cleaning eyeglass lenses.

SUMMARY OF THE INVENTION

The main object of the invention is to provide an apparatus for washing eyeglass lenses automatically, efficiently, inexpensively and conveniently.

The present invention comprises a housing for a reservoir of cleaning solution and a supply of drying tissue, a trough for holding eyeglasses while their lenses are being washed and while they are draining, a means for recycling excess cleaning solution, and a means for drawing cleaning solution from said reservoir and spraying it on said eyeglass lenses. The spray nozzles used in the invention are adjustable vertically and horizontally, and are removable so the spray can be adjusted for different size lenses.

DETAILED DESCRIPTION OF A PREFERRED EMBODIMENT

The present invention has several advantages over the prior art. Most importantly, it is an inexpensive device that does not require electricity for cleaning or drying lenses. The present invention uses a simple squeeze-type bulb pump to provide a very economical way of cleaning eyeglass lenses that is at least as convenient as any means presently known in the art. It uses a trough to hold the eyeglasses in position between the cleaning nozzles to provide a simple, economical and reliable means of aligning eyeglass lenses for cleaning. Since the trough also serves as a drain to remove excess cleaning solution, drying begins simply, naturally and automatically, and may be completed immediately if needed using tissues from the built-in tissue dispenser. These drains serve double duty as breathing means for the reservoir as solution is pumped from it. And proper selection and alignment of replaceable nozzles permits the user to select the most effective spray pattern and angle for the cleaning solution and eyeglass lenses in the holding trough.

Figure 1:
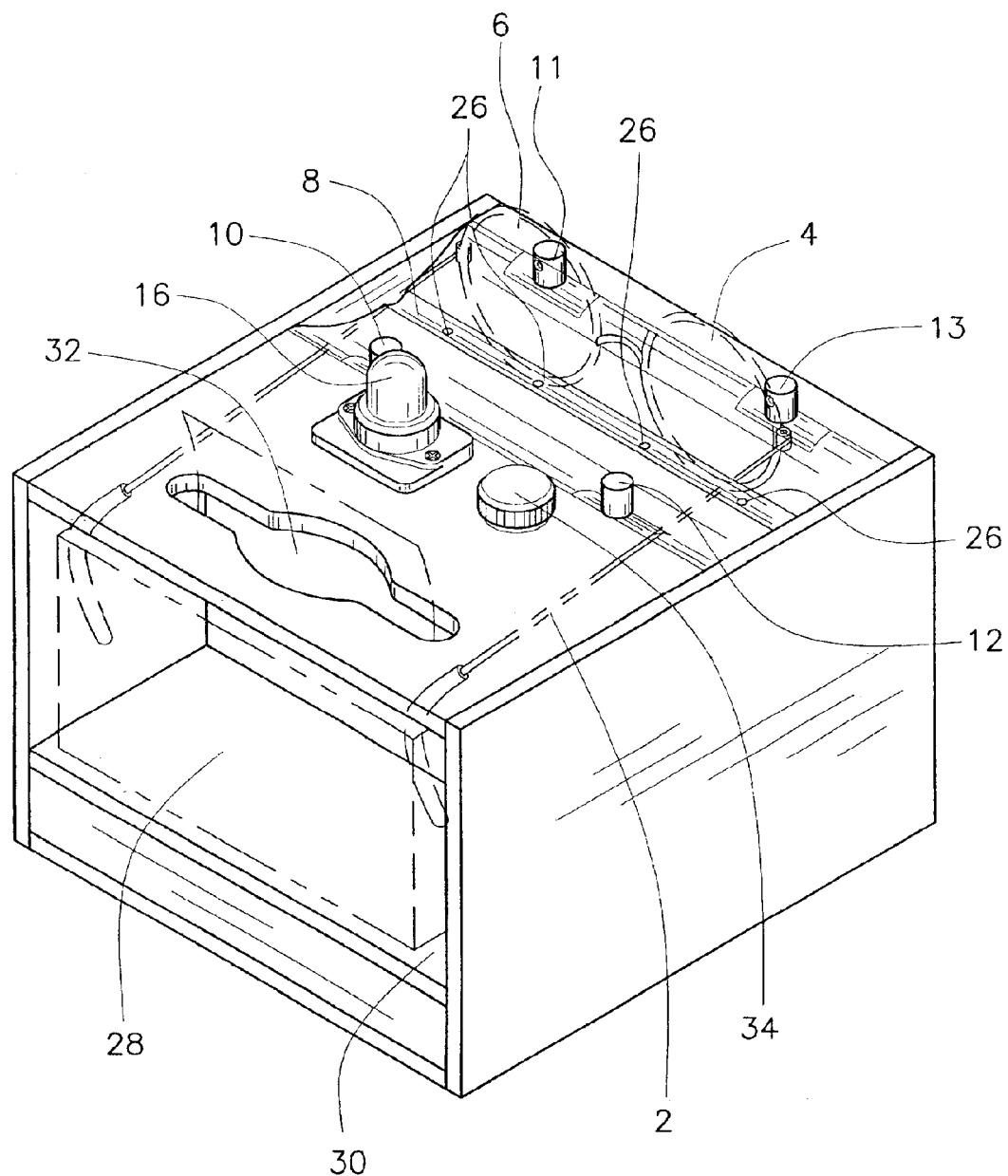
FIG. 1 illustrates the invention with a pair of eyeglasses in place for washing the lenses.
Figure 2:
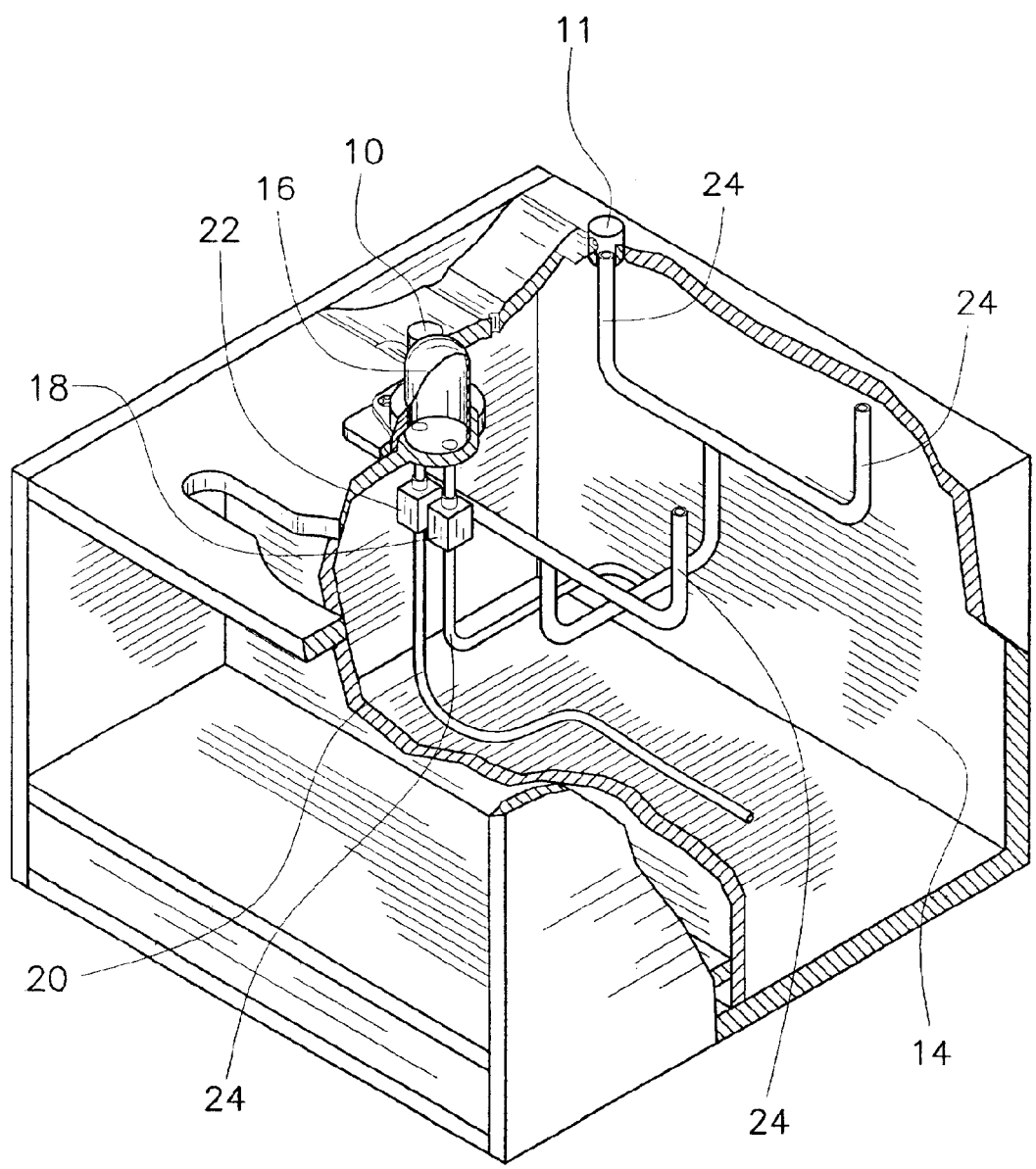
FIG. 2 is a cut-away view of the invention illustrating the tubing and valves between the reservoir, pump and nozzles.

FIGS. 1 and 2 illustrate a preferred embodiment of the present invention. FIG. 1 illustrates the basic invention, and FIG. 2 is a cut-away view illustrating the tubing through which the eyeglass cleaning solution flows. In FIG. 1, eyeglasses 2 with right lens 4 and left lens 6 are held in place in trough 8 with lens 6 between a first nozzle 10 and a second nozzle 11 such that nozzle 10 may dispense cleaning solution on the inside surface of lens 6 and nozzle 11 may dispense cleaning solution on the outside surface of lens 6, and lens 4 between a third nozzle 12 and a fourth nozzle 13 such that nozzle 12 may dispense cleaning solution on the inside surface of lens 4 and nozzle 13 may dispense cleaning solution on the outside surface of lens 4. All four nozzles may be adjustable vertically and horizontally and for different spray patterns and angles, and they may be capable of being replaced by different nozzles that would cause various spray patterns to be dispensed on said surfaces of lens 4 and lens 6. Since nozzles 10–13 are readily removable, they can be easily removed and cleaned or replaced if they become clogged.

The nozzles used for the embodiment illustrated in FIGS. 1 and 2 were manufactured by Newman-Green, Inc. Newman-Green Models 102, 103, 110, 112, 120, 122, 130, 150, 152, 160, 162, 166, and 197 all mount into the invention, but other nozzles available on the market could also be used.

Reservoir 14 in FIG. 2 contains cleaning solution and is in fluid communication with primer bulb pump 16 and nozzles 10–13. Pump 16 is primed with cleaning solution when said solution is pulled by suction from reservoir 14 into tubing 20 and thence through inlet check valve 22 and thence into bulb 16. After bulb 16 is filled with cleaning solution, pinching bulb 16 causes its contents to be squeezed out such that cleaning solution flows through outlet check valve 18 into all four branches of tubing 24, and thence through nozzles 10–13, thereby spraying both sides of lenses 4 and 6 with a spray pattern of cleaning solution determined by the nature of nozzles 10–13. The suction caused when bulb 16 is released, causes more cleaning solution to be drawn from reservoir 14 into bulb 16 as described above for priming pump 16. In FIG. 2, check valves 18 and 22 are drawn below bulb 16, but in a preferred embodiment of the invention using a primer bulb assembly manufactured by Husqvarna, said check valves may be an integral part of the pump-check valve assembly. In that case, tubing 20 may be attached directly to the inlet of valve 22 and tubing 24 to the outlet of valve 18. In the preferred embodiment of the invention using the Newman-Green nozzles and the Husqvarna primer bulb assembly, tubing 22 is 0.0625" ID and tubing 24 is 0.125" ID.

Excess cleaning solution drains back into reservoir 14 via a plurality of is drain/breathing holes 26 in the bottom of trough 8, which also permit air into reservoir 14 to replace cleaning solution in as it is pumped out. In this preferred embodiment of the invention, the number of drain/breathing holes employed is four. Eyeglasses 2 may be left for lenses 4 and 6 to dry in tough 8 or said lenses may be dried with tissue 28 stored in tissue chamber 30 by removing a tissue through dispenser 32. Reservoir 8 may be refilled with cleaning solution by pouring fresh solution in through cap 34.

It will be appreciated by those skilled in the art that the present invention is not limited to what is shown here by way of example only.

I claim:

1. An eyeglass cleaning apparatus comprising a box-like housing provided with:
    a chamber for holding tissue and a slot for dispensing said tissue from said chamber;
    a reservoir for holding cleaning solution;
    two pairs of replaceable nozzles, with the pairs sufficiently far apart and the members of each pair facing one another and sufficiently far apart for spraying all four lens surfaces of eyeglasses placed in the spray path of said nozzles;
    a trough above said reservoir for holding a pair of eyeglasses in said trough so that each lens surface of said eye glasses faces a different one of said nozzles;
    a plurality of drain/breathing holes in the bottom of said trough and the top of said reservoir; and
    a primer bulb pump in fluid communication with:
        said reservoir via input tubing and an input check valve such that said input check valve permits cleaning solution to be drawn from said reservoir through said input tubing and into said bulb pump when said bulb pump is permitted to fill, and
        said nozzles via an output check valve and output tubing such that said out put check valve permits cleaning solution to be pumped from said bulb pump through said output tubing to said nozzles and sprayed onto each of said lens surfaces of said eyeglasses when said bulb pump is squeezed to empty it.

2. The apparatus in claim 1 where said nozzles have adjustable spray patterns.

3. The apparatus in claim 1 where said nozzles have adjustable spray angles.

4. The apparatus in claim 1 where said nozzles are interchangeable.

5. The apparatus in claim 1 with four drain/breathing holes.

6. The apparatus in claim 1 where said pairs of nozzles are approximately 3 to 4 inches apart and the members of said pairs of nozzles are approximately 2 inches apart.

7. The apparatus in claim 1 where said housing is approximately 6" wide by 6" long by 2" tall.

8. The apparatus in claim 1 with a pair of eyeglasses positioned in said trough for cleaning both surfaces of said lenses of said eyeglasses.

* * * * *